Feb. 25, 1958  J. P. BUTTERFIELD  2,824,626
COMBINED ELECTROMAGNETIC AND STRAP-TYPE BRAKE
Filed May 28, 1954  3 Sheets-Sheet 1

INVENTOR.
John P. Butterfield.
BY
Hansen and Harris
ATTORNEYS.

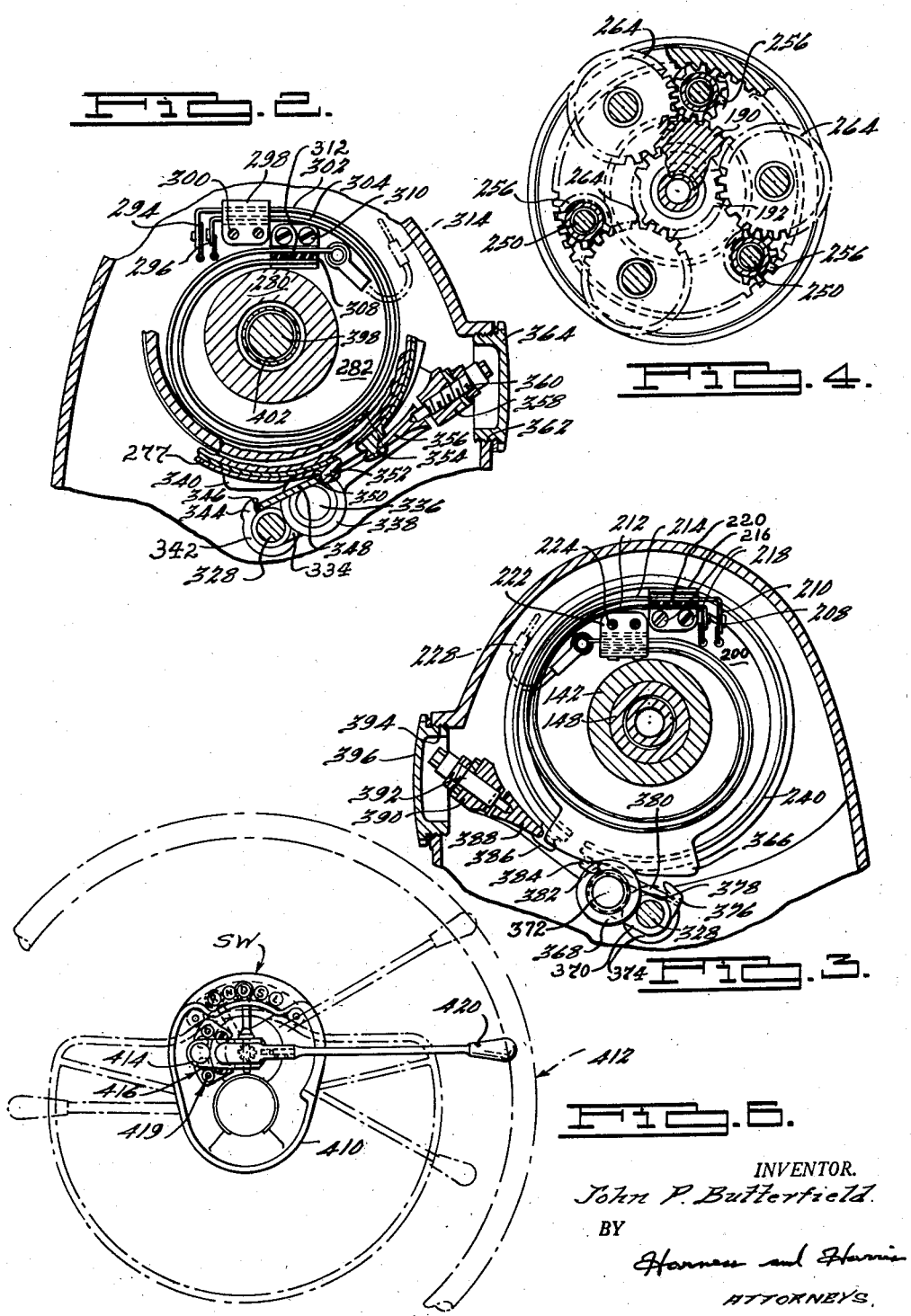

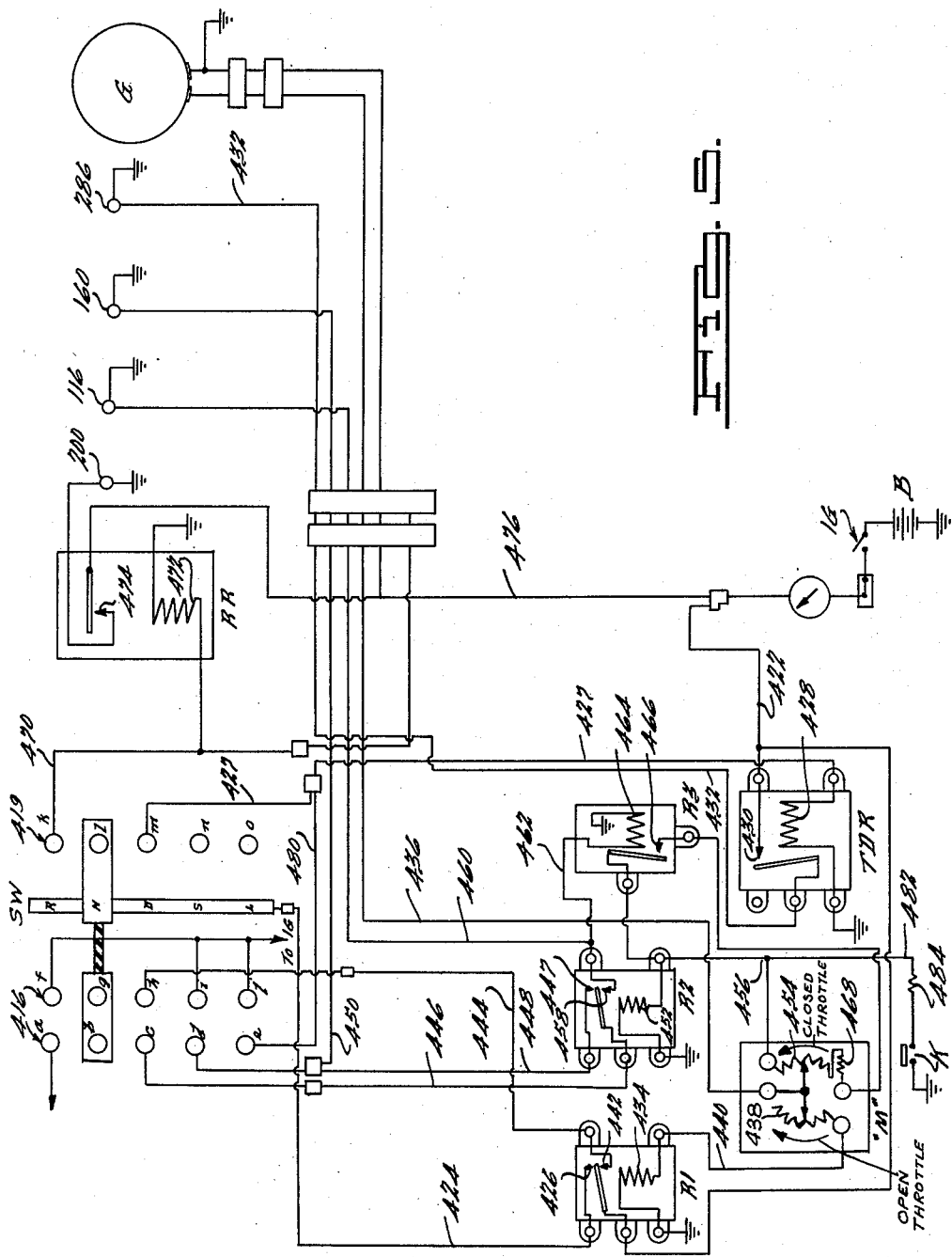

United States Patent Office 2,824,626
Patented Feb. 25, 1958

2,824,626

COMBINED ELECTROMAGNETIC AND STRAP-TYPE BRAKE

John P. Butterfield, Grosse Pointe Park, Mich., assignor to Chrysler Corporation, Highland Park, Mich., a corporation of Delaware Application May 28, 1954, Serial No. 432,974

9 Claims. (Cl. 188—140)

The present invention is generally related to automatic multiple speed transmissions and to a means for automatically controlling the reduction gear elements thereof for obtaining variations in the overall transmission speed ratio. The transmission of the present invention is particularly adapted to be used in road vehicles for delivering power from the vehicle power plant to the driving wheels.

An object of the present invention is to provide a new and advantageous means for controlling the gear elements of an automatic transmission which comprises an electromagnetic portion and a friction braking portion for braking certain of said elements during operation of the transmission wherein said friction braking portion is adapted to supplement the braking action of the said electromagnetic portion when the latter is energized.

Other objects will become apparent from the accompanying drawings and the following description of one embodiment of the invention.

In general, the transmission of the presently disclosed embodiment comprises a double compound planetary gear unit having a sun gear input and a planet carrier output. The planetary unit is effective to provide three forward output speeds and one reverse output speed. An electromagnetic brake and an electromagnetic clutch are situated in an axially spaced relationship with respect to the planetary unit and are adapted to selectively control the gear elements of the planetary unit to obtain either of two forward speeds.

In addition, a pair of electromagnetic brake means is situated in close proximity to the planetary unit and is adapted to selectively engage and control certain of the gear elements of the planetary unit to obtain either a reverse speed or a high reduction "low" speed. Friction brake means are operatively associated with each of the pair of electromagnetic brakes for supplementing the braking effort thereof. The magnitude of the braking effort of the friction braking means and the degree to which the same is energized is proportional to the magnitude of the braking torque requirements.

An anterior portion of the housing is adapted to contain a fluid coupling which comprises an engine powered pump and a turbine secured to the planetary power input shaft.

Automatic control means are provided for selectively energizing any of the brake means or the clutch means in sequence in accordance with the operating requirements of the vehicle in a manner which will subsequently be described in detail.

For a more complete understanding of the present invention, reference will be made to the accompanying drawings in which:

Figure 2 is a partial transverse sectional view taken along the section line 2—2 of Figure 1;

Figure 3 is a partial transverse sectional view taken along the section line 3—3 of Figure 1;

Figure 4 is a transverse sectional view of the component planetary gear unit taken along the section line 4—4 of Figure 1;

Figure 5 is a schematic diagram of the electric circuit for the automatic planetary shift control; and Figure 6 is a view of a steering wheel for a conventional automotive vehicle showing a manual selector switch which constitutes a portion of the automatic shift control circuit.

Figure 1:
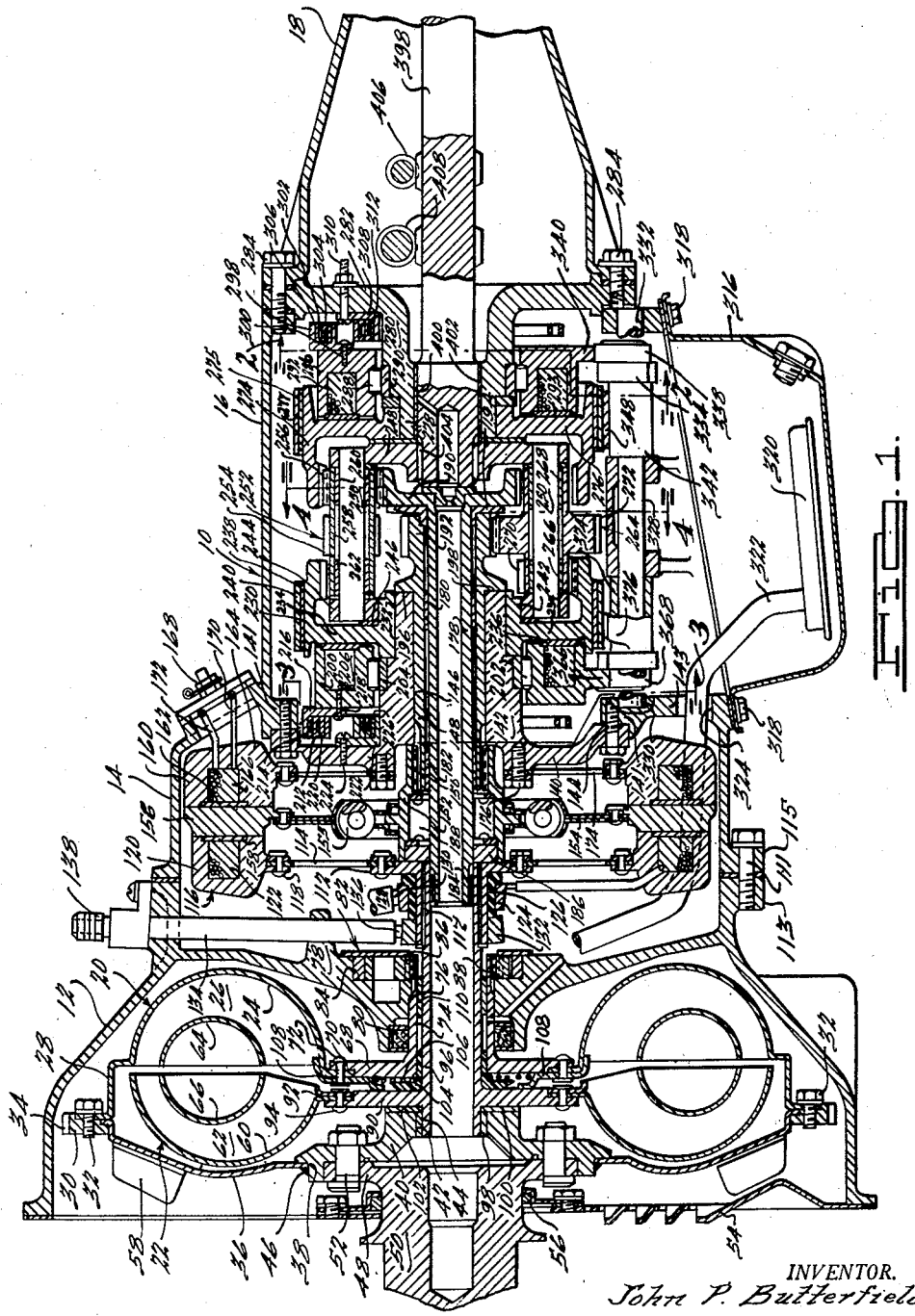
Figure 1 is a longitudinal cross sectional view showing the transmission assembly.

Having reference first to the assembly view of Figure 1, the transmission housing is generally designated by means of numeral 10 and it comprises a forward housing portion 12, an intermediate housing portion 14, another intermediate housing portion 16 and tail shaft or end housing portion 18.

The forward housing portion 12 encloses a fluid coupling comprising a coupling pump member 20 and a driven turbine member 22. The pump member 20 includes an outer torus shroud 24 which is adapted to retain a plurality of angularly spaced pump blades 26 disposed about the central pump axis and which is provided with a peripheral extension 28. The extension 28 may be adapted to be secured to a ring gear member 30 by means of bolts 32. The ring gear member is formed with external teeth 34 which are adapted to be drivably engaged with the driving pinion of a suitable vehicle engine starting motor, not shown.

The ring gear 30 is secured to the outer periphery of a flexible flywheel member 36 which is provided with a large center aperture 38 within which a hub portion 40 is axially secured. The hub portion 40 is provided with a relatively small aperture 42 within which a bushing 44 is adapted to be retained. The outer periphery of the hub portion 40 is welded at 46 to the inner periphery of the flexible flywheel 36 as shown.

The hub portion 40 may be secured to a radial flange 48 formed on an engine crankshaft, the end portion of which is shown at 50, by means of suitable bolts 52. A suitable louvered end plate may be situated, as shown at 54, to provide protection for the moving fluid coupling elements during the operation of the vehicle engine. The plate 54 may be provided with a suitable aperture for receiving the crankshaft portion 50 and may also be provided with a suitable seal 56 for slidably contacting the periphery of the crankshaft portion 50. Cooling blades 58 may be provided, as shown, on the flexible flywheel 36 for the purpose of producing a circulation of cooling air through the housing portion 12.

The turbine member 22 comprises an outer torus shroud 60 which is adapted to retain a plurality of angularly spaced turbine blades 62 disposed about the central turbine axis. The pump member 20 and the turbine member 22 are each provided with inner circular shrouds 64 and 66, respectively, which define the inner boundary of the torus circuit within which the turbine and pump blades are disposed.

The pump member 20 is provided with a radially extending hub portion 68 which may be secured to an inwardly extending flange 70 on the pump outer shroud 24 by means of suitable fasteners 72. The hub portion 68 includes an axially extending hollow sleeve 74 which is received within a central axially extending bore 76 within a partition wall structure 78.

The wall structure 78 is formed integrally with the transmission housing portion 12 and is effective to separate the same from the intermediate housing portion 14. A suitable fluid seal 80 may be provided within the central bore 76 to provide a sealing contact with the sleeve 74. A positive displacement pump assembly, shown generally at 82, may be provided within a recess 84 formed on the rearward face of the wall structure 78 for charging the fluid coupling torus circuit with fluid through suitable pump discharge passages, not specifically illustrated. The pump 82 includes a rotor member 86 which may be positively driven by an externally splined end portion 88 of the sleeve 74 as shown in Figure 1.

The turbine member 22 includes a radially extending hub portion 90 which is disposed in juxtaposition with respect to pump hub portion 68. The turbine outer shroud 60 may be provided with an inwardly directed flange 92 which may be secured to the outer periphery of the hub portion 90 by means of suitable fasteners 94. The hub portion 90 includes a central axially extending sleeve 96, one end of which may be received within the aperture 42 of the hub portion 40 and rotatably journaled therein by a suitable bushing 98. A spacer bearing 100 may be provided between an axial face 102 of the hub 40 and the radially extending portion of the hub 90.

A seal 104 may be provided, as shown, between the hub portions 68 and 90 for retaining the hydraulic fluid within the torus circuit defined by the pump and turbine members 20 and 22 respectively. The seal 104 comprises a radially extending shoulder portion formed of a suitable sealing material which is biased axially against the hub portion 90 by a conical coil spring 106 seated upon the adjacent hub portion 68 and retained thereon by suitable retainers 108. The retainers 108 may be secured about the periphery of the hub portion 68 by the fasteners 72.

A bushing 110 is provided between the sleeves 74 and 96 for the purpose of rotatably and concentrically supporting the latter. The rearward end of the sleeve 96 extends axially into the chamber defined by the intermediate housing portion 14. The housing portion 14 is secured to the housing portion 12 in axially adjacent relationship therewith by suitable bolts 111 extending through mating flanges 113 and 115 formed about the periphery of their respective housing portions as shown. Splines 117 are provided on the extended end of sleeve 96 for drivably engaging an internally splined clutch hub portion 112 which carries an apertured circular disc 114. An electromagnetic clutch element, designated generally by numeral 116, may be secured to the outer periphery of the disc 114 by suitable fasteners 118 as shown.

The electromagnetic clutch element 116 includes a body portion 120 and a core portion 122 which is disposed therein. The core portion 122 comprises a plurality of electric windings, one end of which may be connected in any suitable manner to a slip ring 124 concentrically disposed about the clutch hub portion 112 and insulated therefrom by a suitable insulating material 126. An insulated electrical conduit 128 may be mounted, as shown, within the housing portion 14 and adapted to slidably contact the slip ring 124 by means of suitable brushes 130.

The other end of the windings 122 may be suitably grounded to the body portion 120 which in turn is electrically connected to a slip ring 132 through the disc 114 and the hub portion 112. An electrical conduit 134 slidably contacts the slip ring 132 by means of a suitable brush 136 and extends to the exterior of the transmission housing as shown at 138. The conduits 128 and 134 together constitute a portion of the electrical circuit for the electromagnetic clutch 116 and provide a means for energizing the windings 122 thereof.

Housing portion 14 is separated from the other intermediate housing portion 10 by means of another transversely extending wall structure, shown at 140, which includes an axial extension 142 at the center portion thereof. The wall structure 140 is secured by means of bolts 144 to an inwardly extending shoulder 141 formed about the rearward peripheral edge of the housing portion 14, as shown. The rearward peripheral edge of the lower housing portion 14 is directed radially inward as shown to form a vertical wall extension or flange 143.

Extension 142 is provided with a central aperture 146 which receives therein an axially extending sleeve 148, one end of which is splined at 150 to a concentrically disposed armature hub member 152. A flexible, radially extending disc 154 is drivably secured to the armature hub member 152 and is adapted to carry about the periphery thereof an armature member 156. A conventional spring torsional dampening means 155 comprises the driving connection between the member 152 and disc 154 and is adapted to permit a limited amount of angular deflection therebetween. Armature member 156 comprises an annular disc which is concentrically disposed about the axis of the hub portion 152 in close axial proximity to the electromagnetic clutch member 116 and is adapted to undergo limited axial displacement by virtue of the inherent resiliency of the disc 154. A suitable friction element 158 may be provided as shown between the adjacent surfaces of the clutch member 116 and the armature member 156.

An electromagnetic brake member 160 is disposed in close proximity to the other axial face of the armature member 156 and may be separated therefrom by a suitable friction element 162. The electromagnetic brake member 160 comprises a body portion 164 and a core portion 166 which is received within the body portion as shown. The core member 166 comprises a plurality of electrical windings, the ends of which may be connected to suitable terminals 168 by the leads 170 and 172. The body portion 160 may be supported by a radially extending disc 174 which is secured at the central portion thereof to the wall structure 140 by means of suitable bolts 176.

A shaft 178 is concentrically disposed within the sleeve 148 and is rotatably journalled therein by suitable bushings 180 and 182. A forward end of the shaft 178 is splined at 184 to the sleeve 96 thereby providing a driving connection between the shaft 178 and the turbine assembly consisting of turbine member 22, the turbine hub portion 90 and the sleeve 96. A suitable spacer 186 may be provided about the shaft 178 for concentrically supporting the armature hub portion 152 thereabout. A one-way clutch assembly 188 is provided, as shown, between the internal surface of the armature hub portion 152 and the cylindrical outer surface of the shaft 178 which form outer and inner clutch races respectively. The one-way clutch assembly may be of conventional construction and is operative to enable rotation of shaft 178 independently of hub 152 and armature 156 when shaft 178 is power driven in its normal direction of rotation by turbine 22. Upon application of torque to shaft 178 tending to rotate the same in the opposite direction, or upon application of torque to hub 152 urging the latter to override shaft 178 in the aforesaid normal direction of rotation, as for example during a push-start as explained below, the one-way clutch assembly effects interengagement between shaft 178 and hub 152 for rotation as a unit.

A planetary sun gear 190 is disposed at the rearward end of the shaft 178 and it constitutes one element of a compounded planetary gear unit which will subsequently be described in detail. Another planetary sun gear, shown at 192 and having a relatively reduced pitch diameter, is disposed at the rearward end of the sleeve 148 adjacent the sun gear 190 and is separated therefrom by a spacer bushing 194. The sleeve 148 is provided with an annular shoulder 196 which is adapted to axially contact a radially extending end surface 198 formed on the extension 142 of the wall structure 140.

An electromagnetic brake element 200 is rotatably mounted about the wall structure extension 142 upon suitable needle bearings 202 which are adapted to rotate about a circular bearing race 204. The electromagnetic brake member 200 includes a core 206 which comprises a plurality of electrical windings, the ends of which are connected to leads 208 and 210, respectively, as shown in Figure 3. The leads 208 and 210 are connected to the ends of each of a pair of coil spring loops 212 and 214, respectively, which are received in and supported by an adaptor 216 secured to the electromagnetic brake member 200 by means of bolts 218. The adaptor 216 includes a channel section within which the coils 212 and 214 are secured between alternate layers of suitable insulating material 220.

The coils 212 and 214 encircle the wall structure extension 142 and terminate in an adaptor 222 which is secured to the wall structure 140 by means of bolts 224 as shown in Figures 1 and 3. The adaptor 222 is provided with a channel section which is adapted to retain the ends of the coils 212 and 214 therein between suitable layers of insulating material 226. The end of the coil 212 is grounded to the transmission housing through the adaptor 222 and the end of the coil 214 is electrically connected to a suitable electrical lead 228, as shown in Figure 3. Electric current may be supplied from the lead 228 to the windings of core 206 through the coil 214 and the windings may then be grounded through the coil 212 to complete the circuit. The coils 212 and 214 are adapted to permit a considerable degree of rotation of the electromagnetic brake member 200 about the wall structure extension 142 during the operation of the transmission without affecting the electrical circuit for the core windings.

A planetary ring gear member 230 is rotatably mounted about an end portion 232 on the wall structure extension 142 and includes a radial web portion 234 which is disposed in proximate adjacent relationship with respect to the electromagnetic brake member 200 and separated therefrom by a suitable friction element 236. The ring gear 230 is further provided with a peripheral friction braking surface 238 about which an external brake band 240 is circumferentially disposed. An axially elongated hub for the ring gear member 230, which is designated by numeral 242, is adapted to receive thereabout and rotatably carry a planetary carrier element 244 which is spaced from the radial web portion 234 of the ring gear member 230 by means of a suitable spacer 246.

The planetary carrier element 244 comprises a portion of a carrier assembly which further includes planetary carrier element 248 and a plurality of circumferentially spaced pins 250 which interconnect the carrier elements 244 and 248. Double planetary pinions, generally designated by numeral 252, are rotatably mounted on alternate ones of the pins 250. Each of the double planetary pinions 252 comprises a first pinion portion 254 and a second pinion portion 256 which are integrally connected to a common hub sleeve 258 rotatably journalled on associated pins 250 by suitable bushings 260 and 262. The pinion portion 256 is operatively engaged with the sun gear 190 and is adapted to be driven thereby upon rotation of the shaft 178 which is operatively connected to the turbine member 22.

A plurality of other double planetary carrier pinions 264 are rotatably journalled upon the remaining pins 250 by means of suitable bushings 266 and 268, as shown, and they comprise a first pinion portion 270 and a second pinion portion 272, the former being of a smaller pitch diameter than the latter. The pinion portion 270 is operatively engaged by the ring gear 230 and the pinion portion 272 is operatively engaged with the sun gear 192. As best seen from Figures 1 and 4 taken together, the carrier pinion portions 252 are operatively engaged with the carrier pinion portions 272.

A second ring gear member 274 is provided in axial spaced relationship with respect to the first ring gear member 230 and is operatively engaged with the pinion portions 256 of the double compound carrier pinions 252. Ring gear member 274 is provided with an external cylindrical friction braking surface 275 about which a friction brake band 277 is circumferentially disposed. The ring gear member 274 includes a radial web portion 276 and is rotatably mounted upon an end portion 278 of a housing extension 280 which is integrally formed with an end wall structure 282 transversely disposed across the transmission housing in the vicinity of the juncture between housing portion 16 and housing portion 18. The adjacent ends of the housing portions 16 and 18 and the peripheral edge of the wall structure 282 are integrally assembled by means of bolts 284.

Another electromagnetic brake element 286 is rotatably journalled upon the extension 280 by means of suitable needle bearings 288 which are adapted to engage bearing race element 290. The brake element 286 is disposed in proximate adjacent relationship with respect to the web portion 276 of the ring gear member 274 and is separated therefrom by a suitable friction element 293. The electromagnetic brake 286 includes a core 292 which comprises a plurality of electrical windings, the ends of which are adapted to be connected to the leads 294 and 296, respectively as shown in Figure 2.

An electrical adaptor 298 is secured to electromagnetic brake element 286 as shown in Figures 1 and 2 by means of suitable bolts 300 and is provided with a channel-shaped portion within which the ends of a pair of spring coil conductors 302 and 304 are secured. The conductors 302 and 304 encircle the wall structure extension 280 and are adapted to permit a considerable degree of angular movement of the electromagnetic element 286 upon needle bearings 288. Suitable insulating layers 306 may be provided for insulating the ends of the coils 302 and 304 as shown.

A similar electrical adaptor 308 is secured to the wall structure 282 by means of suitable bolts 310, as shown in Figures 1 and 2, and is adapted to secure the other ends of the spring coil conductors 302 and 304 between suitable insulating layers 312.

The leads 294 and 296 may be connected to one end of the coils 302 and 304, respectively, as shown in Figure 2. The other end of the coil 302 is connected to an electrical lead 314 which may extend externally of the transmission housing and the other end of the coil 304 is adapted to be grounded to the transmission housing thereby completing the electrical circuit for the core windings.

An oil sump 316 is secured beneath the housing portion 16 by means of bolts 318 and is adapted to contain a supply of lubricating oil for the planetary gear unit enclosed within the housing portion 16. A filter element 320 is disposed at the bottom of the oil sump 316 and is connected to the intake of the positive displacement pump 82, not specifically illustrated, by means of an oil supply conduit 322 which is adapted to extend through an aperture 324 formed in the inwardly directed flange 143 of the housing portion 14.

A cross shaft 328 extends longitudinally through the housing portion 16 and is fixed at one end thereof within a suitable aperture 330 formed in the inwardly directed flange 143 of the housing portion 14. The other end of the cross shaft 328 is fixed in the rearward end of housing portion 16 as shown at 332. The cross shaft 328 is provided with an arm 334 which is rotatably journalled thereon as shown at Figures 1 and 2, and which extends transversely therefrom. The extended end of the arm 334 has secured thereto a hub element 336 upon which a cam follower roller 338 may be rotatably journalled.

The electromagnetic brake element 286 has disposed on the lower periphery thereof a cam 340 comprising cam portions with oppositely disposed cam surfaces, said cam 340 being situated in substantially the same transverse plane as the cam follower 338. The cam 340 is adapted to contact the cam follower 338 and rotate the arm 334 upon rotation of the electromagnetic brake element 286 about its axis in either direction.

A hollow sleeve member 342 is journalled on the cross shaft 328 near one axial end thereof and is provided with a transverse extension 344 as best seen in Figure 2. The arm 334 is formed integrally with this sleeve member 342. Extension 344 is provided with a longitudinally extending recess 346 within which is received one end of a spacer element 348. The other end of the element 348 is received within a longitudinal recess 350 formed in a brake band terminal adaptor 352 which is integrally formed on one end of the brake band 277. The other end of the brake band 277 has secured thereto a terminal portion 354 which is adapted to operatively engage a extension 356 of an adjustable anchor member 358 secured to the transmission housing portion 16 by means of a manually adjustable screw 360. An internally threaded aperture 362 may be provided in the transmission housing portion 16 to provide access to the screw 360 for adjusting the position of the anchor member 358 and may be covered by a suitable threaded cap 364.

The electromagnetic brake element 200 is similarly provided with a cam, as shown at 366 comprising two coplanar portions with oppositely directed slopes. The cam 366 operatively contacts a cam follower roller 368 journalled upon the end of an arm 370 by means of a suitable hub element 372. The arm 370 is rotatably journalled on and extends transversely from the cross shaft 328 and is adapted to be rotated thereon upon rotation of the electromagnetic brake element 200 and its associated cam 366 about the central axis. A sleeve element 374 is formed integrally with the arm 370 adjacent the ends of the brake band 240 and it includes an integral extension 376 having an axially extending recess 378 as shown in Figure 3. One end of a spacer element 380 is received within the recess 378 and the other end is received with a similar recess 382 formed in a terminal portion 384 of the brake band 240. The other end of the brake band 240 includes another terminal portion 386 which is adapted to operatively engage an extension 388 of an anchor element 390 adjustably secured to the transmission housing portion 16. The anchor element 390 may be adjusted by a suitable screw 392 which is accessible from the exterior of the housing portion 16 by means of a threaded aperture 394. A suitable threaded cap member 396 may be provided for covering the aperture 394.

The rearward housing portion 18 encloses an output tail shaft 398 which extends through a central bore 400 formed in the extension 280 of the wall structure 282 and which is rotatably journalled therein by suitable bearings 402. The end of the shaft 398 is splined at 404 to the carrier element 248 to provide a driving connection therewith. A conventional speedometer driving gear and mating gear worm may be mounted within the housing portion 18, as generally shown at 406, to provide a means for measuring the output speed of the shaft 398. A similar worm gear drive may be provided as shown at 408 for the purpose of powering an electric governor which forms a portion of the automatic controls to be described in the following paragraphs.

Referring next to Figure 5, a schematic wiring diagram is shown for a suitable automatic control for the disclosed embodiment of the invention and it includes five individual electrical relays. The first, second and third relays are designated by the symbols "R1," "R2," and "R3" respectively. A time delay relay is designated by the symbol "TDR" and a reverse relay is designated by the symbol "RR." An electric governor for providing an automatic control speed signal is generally designated by the symbol "G." A throttle actuated electrical resistance modulator is generally designated by the symbol "M," the vehicle ignition switch is designated by symbol "IG" and the vehicle storage battery is designated by the symbol "B."

A manual selector switch is generally designated by the symbol "SW" and it includes a selector bar element and three rows of contact elements which may be interconnected by the selector bar as the same is manually actuated to obtain the desired transmission speed. The individual contact elements of the rows of electrical contacts are individually designated by the letters a, b, c, d, e, f, g, h, i, j, k, l, m, n, and o.

Referring next to Figure 6, the manual selector switch is shown mounted within the hub portion 410 of a conventional automotive steering wheel 412. The manual selector bar comprises an arm 414 having a first portion adapted to simultaneously connect the electrical contact elements a and f, or b and g, or c and h, or d and i, or e and j, and a second portion adapted to simultaneously contact the electrical contact elements k, l, m, n, and o, respectively, as the same is moved arcuately about the axis of the gear shift column. The first selector bar portion is electrically insulated from the second portion to prevent grounding. The second bar portion is electrically connected to line 424 shown in Figure 5. The pairs of contact elements a through j are generally designated by numeral 416 in Figure 6 and the electrical contact elements k through o are shown generally at 419. The arm 414 is rotated about the associated rows of contacts by a suitable gear shift lever 420.

Referring again to Figure 5, when the selector switch is in the position shown, it is effective to interconnect contact elements b and g of rows 416 while simultaneously interconnecting contact 1 of row 419 with line 424. The portions of the variable selector switch which interconnect the electrical contacts of rows 416 and 419 are insulated as shown. The function of each of the elements of the schematic circuit diagram illustrated in Figure 5 will become apparent from the following description of the operation of the invention.

The operation of the transmission is as follows:

NEUTRAL

The selector bar is moved to the position shown in Figure 5. When the ignition switch "IG" is closed, a battery B energizes lines 422 and 424 by virtue of the connection between these lines provided by the upper contact 426 of the relay "R1." However, the circuit is broken at the selector bar since no electrical leads are provided for the electrical contacts b, g and l adjacent the symbol "N." The electromagnetic elements 116, 160, 200, and 286 therefore are not energized.

Referring to Figure 1, the crankshaft 50 is effective to drive the pump 20 which in turn transmits a torque to the turbine element 22 thereby driving the sleeve 96 and the shaft 178. Since all of the electromagnetic elements are deenergized, the planetary carrier pinions are free to rotate about their axes and no torque is transmitted to the output carrier or tail shaft 398.

*First speed—forward drive*

Referring first to Figure 5, the selector switch is moved so that the electrical contacts adjacent the symbol D are interconnected. The ignition current flows through line 422, through the upper contact 426 of the relay R1 through line 424, through the selector bar and then into the line 427. The current within line 427 is effective to energize time delay relay coil shown at 428 thereby causing the time delay relay contact 430 to close. The ignition current will therefore be permitted to pass from the line 422 through contact 430 of the time delay relay into line 432 and then to the first speed electromagnetic brake 286.

Referring next to Figure 1, the input power is transmitted from the engine driven pump 20 to the turbine 22 which, in turn drives the sleeve 96, shaft 178 and the input sun gear 190. The energized electromagnetic brake 286 is effective to hold the ring gear member 274 thereby allowing the input power to be delivered to the planetary carrier portion 248 and the output shaft 398.

When the electromagnetic brake element 286 is energized, the torque reaction applied to the orbit gear member 274 causes the brake element 286 and orbit gear member 274 to rotate about the central axis upon needle bearings 288. The cam 340 is thereby effective to oscillate the arm 334 and the sleeve 342 by virtue of the inclination of the cam surface. Rotation of the sleeve causes the link element 348 to compress the brake band 277 upon the braking surface of the ring gear element 274. The cam actuated brake band is therefore effective to supplement the braking effort supplied by the electromagnetic brake element 286. Upon an increase in the torque reaction of the ring gear member 274, the pressure applied to the brake band will be correspondingly increased by virtue of the increase in the torque applied to the arm 334 by the cam 340. The braking means for the ring gear element 274 is therefore of the self-energizing type and the braking effort applied thereby is proportional to the braking requirements. The combination of a friction braking element with an electromagnetic braking element has a further advantage in that the diameter of the unit may be reduced considerably in comparison with that of an electromagnetic braking means which does not employ the supplementary braking action of a friction brake band.

Second speed—forward drive

Referring first to Figure 5, the electric governor G is effective to energize the relay coil 434 of the relay "R1" by virtue of a connection provided by line 436, an adjustable rheostat 438 and the line 440. The ignition current is thereby permitted to pass from line 422 through the lower contact 442 of relay "R1" into line 444 and then to line 446 through the contacts of the manual selector switch. The current then passes through the upper contact 447 of relay "R2" into the line 448, and then to the second speed electromagnetic brake 160 through the line 450 thereby energizing the same.

Referring next to Figure 1, the turbine driven shaft 178 drives the power input sun gear 190 as previously explained. The armature member 156 is braked by the energized electromagnetic brake element 160 thereby causing the sun gear 192 to be held stationary. The input power delivered to the sun gear 190 thereby causes the planet carrier pinion portions 254 and 256 to rotate. This in turn causes the pinion portions 264 to rotate by virtue of the interconnection between these portions 264 and the pinion portions 254. Since the pinion portions 264 are engaged with the fixed sun gear 192, the planetary carrier and the output tail shaft 398 are caused to rotate. The time delay relay is effective as shown in Figure 5 to keep the first speed electromagnetic brake energized for approximately 3/10 of a second following the opening of the time delay relay coil circuit at contact 426. This delay will cause an overlap in the first and second speed operation since both the first and second speed electromagnetic brakes will be energized simultaneously for approximately 3/10 of a second. This delay provided by the time delay relay may be accomplished by virtue of the residual magnetism stored in the relay coil 428 which is effective to maintain the time delay relay armature in engagement with the contact 430.

Third speed—forward drive

Referring first to Figure 5, the relay coil 452 of the relay "R2" is energized by the electric governor "G" upon an increase in speed thereof by virtue of the connection provided by line 436, a rheostat 454 and the line 456 thereby causing the relay armature to engage the lower relay contact 458. Ignition current is thereby permitted to pass from line 422 to contact 442 to line 444 and then to line 446 through the associated contacts c and h of the manual selector switch "SW." The relay coil 452 causes the armature of the relay "R2" to engage the contact 458 thereby permitting ignition current to pass from line 446 to line 460 and then to the third speed electromagnetic clutch 116 to energize the same.

A portion of the ignition current is allowed to pass from the contact 458 to the line 462 into the relay coil 464 of the relay "R3" thereby closing the contact 466 of the relay "R3." The relay "R3" is thereby effective to place a second resistance 468 in parallel with the resistance of the rheostat 454 to provide a second path for the flow of current to the relay coil 452 of the relay "R2." It is therefore apparent that the contact 458 will remain closed throughout wide variations in the speed of the governor "G" during the operation of the transmission. Once the contacts 458 are closed they will remain in this position until the speed of the governor "G" is reduced to a value which is considerably less than the governor speed at which the contacts 458 were initially caused to be closed.

Referring again to Figure 1, it is seen that the energized electromagnetic clutch 116 is effective to hold the armature 156 in fixed engagement therewith. This causes sun gears 190 and 192 of the planetary unit to become locked together and the entire planetary assembly therefor is adapted to rotate as a unit thus producing a one to one reduction ratio.

Reverse drive

Referring to Figure 5, the selector switch is moved so that the contacts adjacent the symbol "R" are closed. The ignition current will therefore pass through the line 422, through the closed relay 426, through the line 424, through the manual selector bar into line 470. A relay coil 472 of the relay "RR" will therefore be energized thereby causing the contact 474 to close. Ignition current will therefore pass directly from line 476 through the contact 474 to the electromagnetic brake 200 to energize the same.

Referring next to Figure 1, the turbine driven input sun gear 190 is effective to rotate the carrier pinion portions 256 and 254 of the compound pinions 252 which in turn rotate the adjacent carrier pinion portion 272 of the compound pinions 264. The pinion portion 270 is thereby caused to rotate together with the pinion portion 272. Since the ring gear portion 230 is held by the electromagnetic brake 200 and its associated friction brake band 240, a driving torque will be transmitted to the carrier and the output tail shaft 398 in a direction opposite from that which was obtained in the forward drive speeds.

In addition to the above described operating conditions, the transmission may also be locked in the first speed "low" gear ratio by moving the selector bar of the selector switch "SW" to the position "L" shown in Figure 5. This will cause contact elements e and j to become interconnected and the line 480 will become energized by virtue of the direct connection of contact element j to the ignition switch as indicated in Figure 5. Line 480 is electrically connected to the time delay relay coil 428 as shown and is effective to energize the same thereby causing the contacts 430 to close. Ignition current will therefore energize the first speed brake 286 by virtue of the connection with the ignition switch provided by line 432.

The transmission may also be locked in second speed merely by moving the selector lever of the manual selector switch "SW" to the position "S." It is apparent from Figure 5 that this will cause contact elements d and i to become electrically connected and will cause line 450 to become energized by virtue of the direct connection of the contact element i to the ignition switch as indicated.

The throttle modulator "M" is effective to vary the resistance in the circuit for the relay coils 434 and 452 in response to movement of the vehicle throttle linkage. For example, the effective resistance of the rheostat 438 in series with the relay coil 434 is greater at the full open throttle position of the throttle linkage than at the part throttle position thereof. Therefore the speed of the vehicle and of the electric governor "G" at which the contact 442 will be closed by the relay 434 will be greater at full throttle than at part throttle. Likewise, the effective resistance of the rheostat 454 in series with the relay coil 452 may be similarly varied in proportion to the magnitude of the throttle opening thereby causing a corresponding variation in the vehicle speed at which a shift will occur from second speed to third speed.

The automatic shift controls are also provided with a kickdown switch designated by symbol "K" in Figure 5. If the transmission is operating in third speed forward drive and the operator of the vehicle requires an immediate increase in the transmission reduction ratio to provide an increased accelerating torque, the switch "K" may be closed, a suitable throttle actuated linkage being provided for this purpose. The output current of the speed governor "G" will then be permitted to pass through a line 482, through a suitable resistance 484, and then through switch "K" to the ground. The magnitude of the current which normally passes through the relay coil 452 is correspondingly reduced because of the additional conductive path which is thus interposed in parallel therewith. At vehicle speeds below a predetermined maximum value, the reduction in the amperage passing through relay coil 452 causes the relay contact 458 to open thereby causing the third speed clutch 116 to become deenergized and simultaneously causing the second speed brake 160 to become energized.

In the operation of the individual electromagnetic brake elements 200 and 286, the braking effort applied by the respective brake bands is proportional to the torque reaction applied to the associated ring gear member. When power is being delivered from the engine to the vehicle road wheels, the torque reaction is exerted in one direction and when the road wheels are driving the engine during "engine braking," the torque reaction is exerted in the other direction. However, in either instance the magnitude of the braking effort supplied by the brake bands is proportional to the braking requirements.

During normal operation when power is being delivered to the road wheels from the engine, one of the two oppositely disposed cam portions of the respective cam members 340 and 366 is operative to actuate the associated brake band mechanism. During "engine braking," the other of the cam portions actuates the brake band mechanism.

The one-way clutch assembly which was previously described and which is shown in Figure 1 at 188 and 152, is effective to provide a means for obtaining a "push start" in the event that the vehicle engine starter fails. Under these conditions, a driving torque is applied to the tail shaft 398 which drives the planetary carrier assembly. The planetary pinions 252 will therefore have a tendency to rotate about their own axes as they rotate about the sun gear 190, this sun gear being operatively connected to the turbine member 22 as previously described. As the planet pinions so rotate, they tend to drive planetary pinion 264 which in turn will tend to drive the sun gear 192 and sleeve 148 in the same direction that tail shaft 398 is rotated. The one-way clutch elements 188 therefore engage the shaft 178 and impart thereto a driving torque which may be delivered through the fluid coupling assembly 20, 22 to turn the engine crankshaft.

The power flow path provided by the transmission of the instant invention is particularly smooth by virtue of the smooth operating characteristics of the electromagnetic clutch and brake elements and by virtue of the fluid coupling assembly. The electromagnetic elements are particularly effective in providing a smooth engagement of the clutch or brake surface associated with the planetary elements without a corresponding sudden change in the output torque of the planetary unit.

Further, the overall physical dimensions of the unit are considerably reduced by virtue of the self-energizing feature of the brake assemblies 200 and 286. The torque capacity of these assemblies may be the same as that of a substantially larger electromagnetic brake which does not include therein the supplementary friction brake portion of the type herein disclosed.

Although one particular embodiment of the present invention has been specifically illustrated and described, it is apparent that various modifications thereof may readily be made without departing from the scope of the invention as defined by the following claims.

What I claim and desire to secure by United States Letters Patent is:

1. In a power controlling mechanism, a housing, a rotatable brake drum disposed within said housing comprising a peripheral portion and a circular disc portion, means for braking said brake drum to said housing comprising an electromagnetic unit rotatably journalled on a portion of said housing, a friction brake band surrounding the peripheral portion of said drum in close proximity thereto, means for energizing said electromagnetic unit for braking the disc portion of said drum to the said housing, the braking of said drum being accompanied by a braking torque reaction on said electromagnetic unit, a cam surface formed on said electromagnetic unit, a shaft mounted within said housing adjacent said drum, an arm extending transversely from one portion of said shaft, a cam follower carried by said arm and operatively contacting said cam surface, said arm being adapted to oscillate upon rotary movement of said cam surface, one end of said brake band being anchored to said housing, and the other end of said brake band being operatively connected to another portion of said shaft and movable therewith upon rotation of said arm to energize said brake band, the magnitude of the braking torque of said brake band being proportional to the magnitude of said braking torque reaction.

2. In a power controlling mechanism including a housing and a circular brake member rotatably mounted within said housing; means for braking said brake member to the said housing comprising an electromagnetic unit rotatably mounted in close axial proximity to said brake member, a cam surface integrally carried by said electromagnetic unit and rotatably movable therewith, a shaft rotatably mounted in a portion of said housing and having a transversely extending arm, a cam follower carried by the end of said arm in operative engagement with said cam surface, a brake band disposed about said brake member, one end of said brake band being anchored to said housing and the other end thereof being operatively connected to said shaft and movable thereby upon rotation of said electromagnetic element to cause said brake band to frictionally engage said braking surface.

3. The combination as set forth in claim 2 wherein said electromagnetic unit includes a core of electrical windings and at least one electrical lead extending from said windings to a terminal on said housing, said electrical lead comprising a flexible coil disposed adjacent said electromagnetic unit.

4. The combination as set forth in claim 3 wherein said electromagnetic unit further includes at least one friction element disposed intermediate said electromagnetic core and said adjacent brake member.

5. In a power controlling mechanism comprising a housing and a brake drum rotatably disposed within said housing, means for braking said brake drum to said housing, said braking being accompanied by a torque reaction, said braking means comprising an electromagnetic unit rotatably journalled on a portion of said housing in axially adjacent relationship with respect to said brake drum, a friction brake band disposed about said brake drum, a cam member carried by said electromagnetic unit, a brake band actuating member movably mounted in said housing, and a cam follower element carried by one portion of said actuating member in operative engagement with said cam member, one end of said brake band being operatively connected to another portion of said actuating member and the other end of said brake band being anchored to said housing, said brake band being tightened with a force which is proportional to the magnitude of said torque reaction.

6. The combination as set forth in claim 5 wherein said electromagnetic unit includes a core comprising a plurality of electrical windings, said windings encircling the axis of rotation of said drum, a casing enclosing said windings, said casing being mounted for limited rotation about the axis of rotation of said drum, an electrical terminal, and a flexible coil having convolutions encircling the axis of rotation of said drum, said flexible coil interconnecting said terminal and one end of said windings.

7. In a power controlling mechanism comprising a housing and a rotatable brake member disposed within said housing, said brake member including a first and a second braking surface on separate portions thereof, means for braking said brake drum to said housing, said braking means comprising a friction brake band disposed about said first friction surface, a cam member mounted adjacent said brake drum for limited rotation about the axis of said brake drum, means for frictionally engaging said cam member and said second friction surface, a brake band actuating member movably mounted in said housing, a cam follower element carried by one portion of said actuating member in operative engagement with said cam member, one end of said brake band being operatively connected to another portion of said actuating member and the other end of said brake band being anchored to said housing.

8. In a power controlling mechanism comprising a housing and a brake member disposed within said housing, said brake member being mounted within said housing for rotation about an axis of rotation and having a first portion defining a first braking surface disposed about said axis of rotation, a friction band encircling said first braking surface, said brake member having a second portion defining a second braking surface, a brake element rotatably mounted within said housing in adjacent relationship with respect to said second braking surface, a cam surface formed on said brake element, said band having one end thereof anchored to said housing, a friction band actuator member, the other end of said band being operatively connected to one portion of said actuator member, another portion of said actuator member engaging said cam surface, and means for frictionally engaging said brake element and said second braking surface.

9. In a power controlling mechanism comprising housing means, a brake member rotatably mounted on said housing means, a friction band encircling said brake member and having one end anchored to said housing means, a brake element movably mounted on said housing means, means for braking said brake member to said brake element, a cam surface carried by said brake element, a friction band actuator member, the other end of said band being operatively connected to one portion of said actuator member, another portion of said actuator member engaging said cam surface to be actuated thereby upon shifting of the latter.

References Cited in the file of this patent

UNITED STATES PATENTS

| 694,197 | Rose | Feb. 25, 1902 |
| 1,812,683 | Cadman et al. | June 30, 1931 |
| 1,975,835 | Farkas | Oct. 9, 1934 |
| 2,147,939 | Tishken | Feb. 21, 1939 |
| 2,292,633 | Griswold | Aug. 11, 1942 |
| 2,546,378 | Winther | Mar. 27, 1951 |
| 2,605,862 | Winther | Aug. 5, 1952 |
| 2,660,071 | Winther | Nov. 24, 1953 |
| 2,694,948 | McFarland | Nov. 23, 1954 |

FOREIGN PATENTS

| 119,651 | Great Britain | July 29, 1919 |